United States Patent
Li et al.

(10) Patent No.: US 8,160,039 B2
(45) Date of Patent: Apr. 17, 2012

(54) COMMUNICATIONS METHODS AND APPARATUS FOR USE IN COMMUNICATING WITH ACCESS ROUTERS AND/OR OTHER DEVICES ACTING AS COMMUNICATIONS PEERS

(75) Inventors: Junyi Li, Bedminster, NJ (US); Rajiv Laroia, Far Hills, NJ (US); Saurabh Tavildar, Jersey City, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 707 days.

(21) Appl. No.: 12/268,158

(22) Filed: Nov. 10, 2008

(65) Prior Publication Data
US 2010/0118843 A1  May 13, 2010

(51) Int. Cl.
*H04W 4/00* (2009.01)
(52) U.S. Cl. ......... 370/338; 370/238; 370/329; 370/331
(58) Field of Classification Search ............... None
See application file for complete search history.

(56) References Cited

U.S. PATENT DOCUMENTS

| 7,206,554 | B1 * | 4/2007 | Lindskog | 455/101 |
| 7,599,420 | B2 | 10/2009 | Forenza et al. | |
| 2004/0203468 | A1 * | 10/2004 | Dent et al. | 455/67.14 |
| 2004/0233871 | A1 * | 11/2004 | Seki et al. | 370/331 |
| 2008/0247474 | A1 * | 10/2008 | Kim et al. | 375/260 |

FOREIGN PATENT DOCUMENTS

EP  1207662 A1  5/2002

OTHER PUBLICATIONS

International Search Report & Written Opinion—PCT/US2009/062483 International Search Authority—European Patent Office—Mar. 4, 2010.

* cited by examiner

*Primary Examiner* — Ricky Ngo
*Assistant Examiner* — David Oveissi
(74) *Attorney, Agent, or Firm* — Jeffrey D. Jacobs; Peng Zhu (57) ABSTRACT

Methods and apparatus for performing peer to peer communications with access routers and non-access router peer devices are described. An access terminal generates a channel estimate estimating the channel between the access terminal and an access router. For at least some communication with the access router, a channel compensation operation is performed on a symbol to be transmitted prior to its transmission to the access router. In contrast, symbols transmitted to other access terminals are not subject to a channel compensation operation prior to transmission with the receiving access terminal being responsible for implementing a channel compensation operation on the received signal.

19 Claims, 7 Drawing Sheets

| FIGURE 2A |
|---|
| FIGURE 2B |

COMMUNICATIONS METHODS AND APPARATUS FOR USE IN COMMUNICATING WITH ACCESS ROUTERS AND/OR OTHER DEVICES ACTING AS COMMUNICATIONS PEERS

FIELD

Various embodiments relate to wireless communications methods and apparatus and, more particularly, to wireless communications methods and apparatus for communicating with access routers operating as communications peers and/or with other devices acting as communications peers.

BACKGROUND

Peer to peer communications may occur between a variety of different peer to peer communications devices. Access terminals, e.g., mobile wireless devices, may operate as communications peers in a peer to peer system. Access routers, e.g., base stations which support peer to peer communications and which may also support one or more other, e.g., non-peer to peer communications technologies, may also act as communications peers. Access routers may be supplied with power via wired land lines and thus may have far more available power than access terminals which may be limited by the amount of power that can be supplied, e.g., by a battery which can be held in a person's hand. Some access routers routinely transmit pilots which can be detected and used by device's within the access router's coverage area to generate channel estimates. In some systems these pilots are transmitted on a pilot channel or other control channel and are transmitted irrespective of whether or not traffic data is being transmitted or is waiting to be transmitted. Power consumption by such routine transmissions is normally not a concern since the access router is normally not constrained by battery power limitations Communications systems often include far fewer access routers than access terminals. This is due in part to the fact that access routers are often designed to support communications with multiple access terminals simultaneously. Thus, in such embodiments, access routers may be expected to interact and/or communicate with a large number of access terminals at any given time.

Access terminals which are operating in peer to peer mode may not be communicating signals to an access router on a regular basis if at all. To facilitate channel estimation, prior to transmitting traffic data, a peer communications device may transmit one or more pilots to the peer device which is to receive traffic data. However, in the absence of traffic data to transmit, no pilots may be transmitted.

Given that pilots may not be transmitted by wireless terminals that do not have data to transmit, it may be difficult for an access router to maintain a current estimate of a communications channel between the access router and the wireless terminal. Furthermore, while the access terminal may be able to communicate interactively with a large number of devices, there may still be a far larger number of devices within the coverage area of the access router that are not actively communicating with the access router at a given point in time. Thus, while the access router may have sufficient signals from access terminals with which it is actively communicating traffic data to produce channel estimates, the access router may not have sufficient reliable data to generate channel estimates for all peer to peer communications devices in its coverage area, in part due to the fact that some peer to peer devices may not transmit pilots on a regular basis. In addition, requiring an access router to maintain channel estimates for all access terminals in the access router's coverage area, regardless of their level of communications activity, may place an excessive burden on the access router.

In the case of some peer to peer systems, a receiving device normally generates a channel estimate from signals, e.g., pilot signals, received from a peer to peer device immediately prior to or during traffic data transmission from the transmitting peer device to the receiving peer device. In such systems, the receiving device normally uses a channel estimate generated from the received pilots to correct for distortions introduced into the signal by the communications channel. Such an approach may not be particularly well suited for low data rate transmissions since the pilots may represent an excessive amount of overhead relative to the amount of information being communicated.

It would be advantageous if new methods and/or apparatus could be developed in a peer to peer system which could be used to take advantage of pilot signals routinely transmitted by access routers but that would not require a similar transmission of pilot signals by non-access router peer devices. In addition, it would be desirable if one or more of the new methods or apparatus would allow for communication with an access router using peer to peer signaling without requiring the access router to generate a channel estimate to successfully receive and recover information transmitted to the access router.

SUMMARY

Methods and apparatus for wireless communications in networks, e.g., regional ad hoc peer to peer networks, are described. Among the described methods and apparatus are methods and apparatus for performing peer to peer communications with access routers and non-access router peer devices, e.g., mobile access terminals, which support peer to peer signaling.

In some but not necessarily all exemplary embodiments, a non-across router peer to peer communications device, e.g., an access terminal, generates a channel estimate, by estimating the channel between the access terminal and an access router from one or more pilot signals received from the access router. The channel estimate is used to perform a channel compensation operation for at least some signals transmitted to the access router. The channel compensation operation is performed by the access terminal, in some embodiments, on a symbol to be transmitted prior to its transmission to the access router. In contrast, in some but not necessarily all embodiments, symbols transmitted to other devices e.g., non-access router peer to peer devices such as other access terminals, are not subject to a channel compensation operation prior to transmission. In the case of non-access router peer devices, in at least some embodiments the receiving communications device, e.g., access terminal, is responsible for implementing a channel compensation operation on the received signal. Thus, communications with access routers may take advantage of the pilot signals received from the access router at regular intervals to enable channel compensation at the transmitter side and thereby relieve the access router of the burden of performing channel compensation operations on at least some received peer to peer signals. The pre-transmission channel compensation methods are well suited for, and may be used for control signals and other relatively low bit rate signals, transmitted to access routers. While the pre-transmission channel compensation technique is used for some signals transmitted to an access router, optionally the pre-transmission channel compensation technique may not be used for higher rate data traffic signals between the non-access router peer device and an access router peer device.

In view of the above discussion, it should be appreciated that peer to peer transmission to access routers may involve pre-transmission channel compensation while communications with other peer devices, e.g., other access terminals, may not involve such pre-transmission channel compensation.

An exemplary method of operating a communications device, in accordance with one exemplary embodiment comprises: receiving a pilot from a first access router, generating a first channel estimate of a channel between the first access router and said first communications device, and modifying a first value to be transmitted to said first access router based on at least a portion of said first channel estimate.

One exemplary communications device comprises: at least one processor configured to: i) receive a pilot from a first access router, ii) generate a first channel estimate of a communications channel between the access router and said communications device, iii) modify a first value to be transmitted to said access router based on at least a portion of said channel estimate, and a memory coupled to said at least one processor.

In addition to exemplary methods and apparatus, various aspects are directed to a computer program product for use in a communications device, comprising a computer readable medium comprising: code for causing at least one computer to receive a pilot from a first access router, code for causing at least one computer to generate a first channel estimate of a channel between the access router and said first communications device; and code for causing at least one computer to modify a first value to be transmitted to said first access router based on at least a portion of said first channel estimate.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
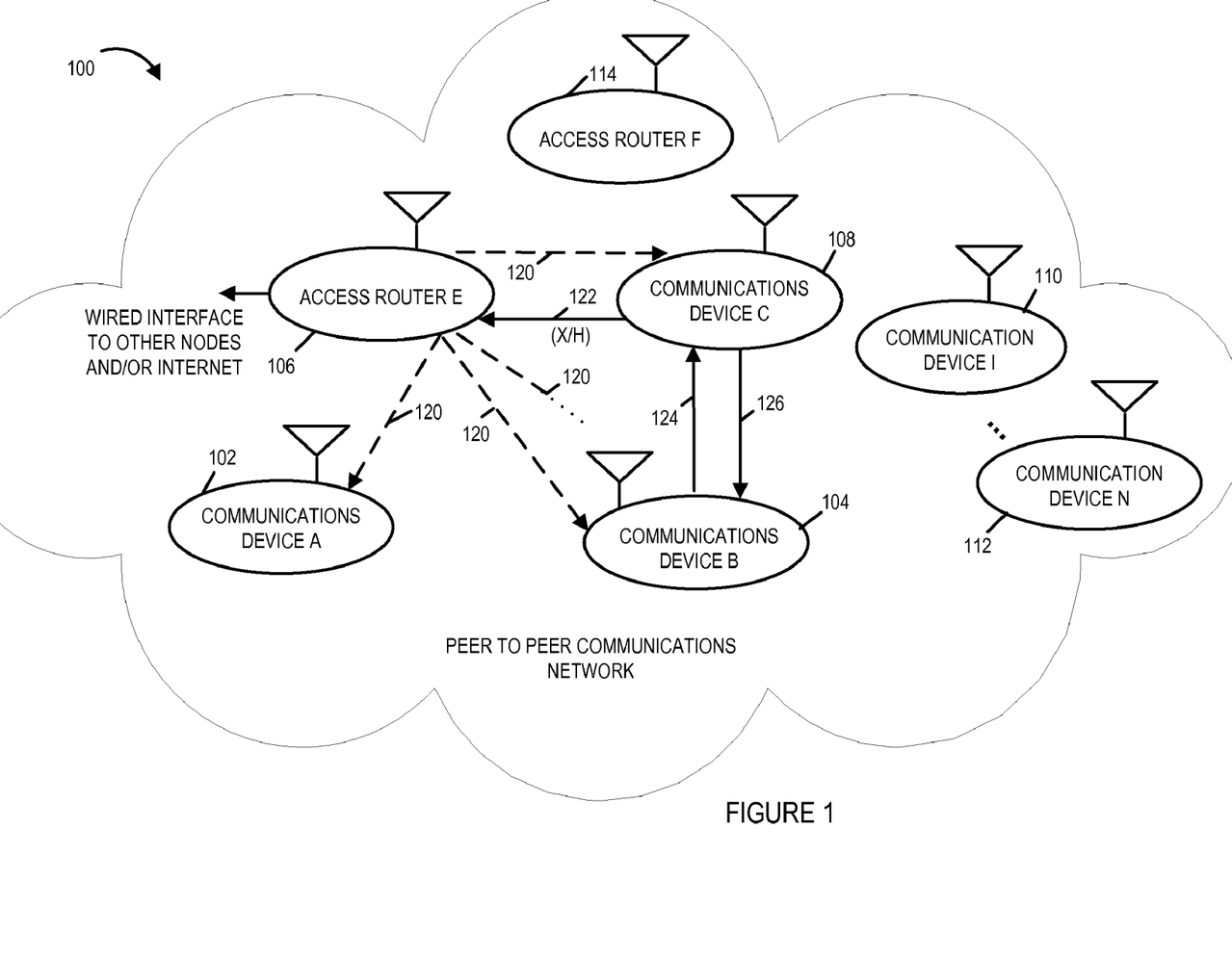
FIG. 1 illustrates an exemplary peer to peer communications network implemented in accordance with one exemplary embodiment.

FIG. 1 is a drawing of an exemplary peer to peer communications network 100, e.g., an ad-hoc peer to peer communications network, implemented in accordance with one exemplary embodiment. Exemplary communications network 100 includes a plurality of wireless peer to peer wireless communications devices (communications device A 102, communications device B 104, communications device C 108, communications device I 110, . . . , communications device N 112) and an access Router 106, e.g., a base station, which also supports peer to peer communications. The access router 106 may support peer to peer communications as well as one or more non-peer to peer based communications protocols. Although one access router 106 has been shown in the communications network 100, it should be appreciated that the communications network 100 may, and sometimes does include several access routers. The wireless communications devices (102, 104, 108, . . . , 112) support various signaling between peers, e.g., peer discovery signals, transmission request signals etc., and data transmissions. Wireless communications devices 102, 204, 108 may be, e.g., handheld battery powered devices. Access router 106 may be located at a fixed site and powered by a power line. The access router may include a wired or optical interface to other network nodes and/or the internet and may provide internet access to one or more peer devices 102, 104, 108. Some of the peer to peer communications devices 102, 104, 108 are mobile communications devices, e.g., handheld mobile communications devices.

In accordance with one exemplary embodiment, the access router 106 periodically broadcasts pilot signals to a number of communications devices in the communications network 100. As shown in FIG. 1, the access router 106 broadcasts pilot signals 120, which may be received by a plurality of devices, e.g., communications device, A 102, communications device B 104, communications device C 108 etc.

In addition to the transmission of pilot signals 120, various other signaling may occur in the system 100. For example, communications device C 108 may seek to communicate with the access router 106 by transmitting a peer to peer transmission request signal 122 to the access router 106. The access router 106 may respond to the peer to peer request signal by transmitting a transmission request response signal. In addition, other signal transmissions may occur in the system. For example, peer discovery signals 124 may be transmitted by the individual wireless terminals. After receiving the peer discovery signal 124, communications device C 108 may generate and transmit a transmission request signal to communications device B 104.

As will be discussed further below, communications device A, B, C 102, 104, 108 can, and in some embodiments do, generate channel estimates from the pilot signals 120 received from the access router 106. The channel estimate generated for the access router 106 can, and in some embodiments is, used in a pre-transmission channel compensation operation to pre-distort transmissions to the access router 106 so that channel compensation is performed prior to transmission to the access router 106. However, when transmitting to non-access router devices, signals may, and often are not subjected to a channel compensation operation prior to transmission. For example, pilots or known symbols may be transmitted with or prior to communications sent to a non-access router peer device with the device receiving the transmission being responsible for performing channel compensation.

Thus, in accordance with some embodiments, the signal 122 sent from communications device C 108 to access router 106 is subject to channel compensation prior to transmission while the signal 126 sent to the communications device B 104 is not subject to a channel compensation operation prior to transmission.

Assuming, for example that signal 122 is intended to communicate a complex symbol value X to the access router 106 and that the channel estimate estimates the channel between communications device C 108 and access router 106 to have a transfer function H. The communication device C 108 may transmit X/H with the goal of having device C 108 receive X. The access router 106 will receive (X/H)*H', where H' is the actual transfer function of the communications channel. Assuming the channel estimate is accurate, H will equal H' and the access router 106 will receive X without the need to perform a channel estimation operation. In contrast, the non-access router per communications device B 104 will receive a channel distorted version of one or more symbols to be communicated and will implement channel compensation on the received signal.

Thus, in some embodiments access terminals, e.g., communications devices 102, 104, 108, . . . , 112 operate differently when communicating with an access router, e.g., access router 106, then when communicating with non-access router peer to peer devices. Access routers 106, 114, e.g., base stations, are coupled, in some embodiments, to a wired or other land based power source. Accordingly, ARs 106, 114 are often not subject to the battery power limitations and constraints which confront may mobile devices. Access routers 106, 114, in accordance with some embodiments of the invention, transmit pilot signals more frequently and/or at higher power levels than non-access router communications devices. The pilots may, and in some embodiments are, transmitted to support non-peer to peer communications. In other embodiments the pilots are transmitted by the access routers to support peer to peer communications.

In various embodiments, a system, e.g., such as communications network 100, includes more peer to peer access terminals than access routers. The access routers 106, 114 may support peer to peer communications in addition to other types of communications. In some implementations, the access terminals generate channel estimates for access routers 106, 114 from the pilot signals they transmit. The channel estimates are then available for compensating, prior to transmission, for distortions which may be introduced by the communications channel. Thus, an access router (AR), e.g., AR 106 can receive signals from peer to peer communications devices and promptly interpret the signal without the need to subject the received signal to a channel correction operation. Significantly, the AR 106 can receive signals from peer to peer devices and promptly interpret them without first having to generate a channel estimate to the peer device from which the signal was received and without having to generate an estimate of the channel between the access router and access terminal. While access terminals (e.g., devices 102, 104, . . . , 112) maintain channel estimates corresponding to access routers 106, 114 even if they are not actively communicating with the access routers 106, 114, the number of access routers within range of an access terminal is normally relatively light as compared to the number of access terminals an access router might have to track and generate channel estimates for if the access router was shouldered with maintaining channel estimates for the peer to peer devices in an area including those with which the access router was not actively communicating. Notably, the individual access terminals (e.g., devices 102, 104, . . . , 112) do not have to transmit signals to generate the estimate of the channel between the access router and the individual access terminals but rather can generate the channel estimate from the pilots received from the access router. Thus, the power usage and processing demands placed on the access terminals to generate and maintain the channel estimates corresponding to access routers 106, 114 within range of the access terminal is relatively limited.

In some but not necessarily all embodiments, for communications with non-access router peer devices, e.g., access terminal to access terminal peer to peer communications, the receiving access terminal, e.g., communications device C 108 generates a channel estimate from signals received from the corresponding peer access terminal, e.g., communications device B 104, and the receiving device performs a channel compensation operation to compensate for distortions introduced by the communications channel. Thus, in at least some embodiments, the access terminals determine whether they are communicating with an access router or another access terminal and store this information for use in deciding whether or not to pre-distort symbols to be transmitted. For at least some of the communications with an access router, e.g., low bandwidth control or other management related signals such as QoS signals, an access terminal performs a channel compensation operation, e.g., a pre-transmission distortion operation, on a symbol prior to transmission of the symbol. However, when communicating with another access terminal, symbols are generated and transmitted without performing channel compensation on the symbol in the access terminal generating and transmitting the signal. Thus, in at least some embodiments, whether or not the transmitting peer to peer communications device performs a channel compensation operation prior to transmission depends on whether the intended recipient is an access router (106, 114) or access terminal. Accordingly, in some embodiments, access terminals pre-distort symbols communicated to access routers 106, 114, e.g., as part of peer to peer signaling with the access router 106, 114, but do not pre-distort symbols communicated to non-access router peer to peer communications devices.

Consider for example one exemplary scenario where an access terminal, e.g., communications device C 108 communicates with an access router, e.g., access router 106. In this example, the access router 106 may have a dedicated channel which it uses to periodically send pilots with the pilots being transmitted independent of whether or not there is traffic data to be transmitted. In the exemplary embodiment the access terminal, i.e., communications device C 108, keeps track of the channel between the peer to peer access terminal 108 and the access router 106. The access router 106 may not know the channel. In some embodiments when the access terminal 108 is to send a traffic request or other information to access router 106, the access terminal 108 generates a symbol, e.g., to be communicated to the using one or more tones. Consider for example, the sending of a traffic transmission request to the access router 106 using a single tone with QoS information being coded on the phase of the single tone. In one such embodiment the fact that the tone has energy on it is used to indicate the presence of a traffic transmission request while the phase of the signal is used to communicate QoS information. In one such embodiment the access terminal 108 modifies at least the phase of the symbol prior to transmission based on the channel estimate between the access terminal 108 and the access router 106. If the symbol to be communicated is x and the channel estimate is h, the symbol is modified by the inverse of the channel estimate prior to transmission by the access terminal 108 to the access router 106. In such a case, the transmitted symbol will be x/h with x being the symbol which the access terminal 108 seeks to communicate. x and h may be complex. However, in embodiments where the amplitude level of the non-zero signal is not used to communicate information, the pre-transmission modification of the symbol to be transmitted may be limited to modifying the phase of the symbol by the inverse of the phase of the channel estimate. As a result of the processing by the access terminal 108, the symbol to be transmitted to the access router 106 will be pre-distorted, at least with regard to the phase component, to compensate for the distortion which will be introduced into the symbol as it is transmitted through the wireless communications channel. Note that the access router 106 will receive (x/h*h') where x/h is the pre-distorted symbol and h' is the actual transfer function of the communications channel. Assuming the estimated transfer function of the channel, h, is the same as the actual transfer function of the channel, h', the access router will receive the symbol, x, which was intended to be communicated.

In some embodiments, the AR receives a single tone from an access terminal which is used to communicate a complex symbol. The presence of signal energy on the tone is used to indicate a transmission request while the phase of the signal is used to communicate a request to transmit traffic data while the phase of the tone is used to communicate QoS information, e.g., relating to the traffic data to be sent, the device or some other predetermined QoS information. In some embodiments the access router (106, 114) uses the received QoS information but it may, and in some embodiments does, also broadcast the QoS information so that other devices can listen to the QoS information supplied by the non-access router peer to peer communications device thereby allowing multiple communications devices in a region to receive the QoS information originating from an individual communications device without the need for the communications device to directly communicate with each of the multiple communications devices in the region. Based on the QoS information, peer to peer communications devices can, and in some embodiments do, decide whether or not to proceed with their own traffic transmissions or if they should refrain from transmitting.

Figures 2, 2A:
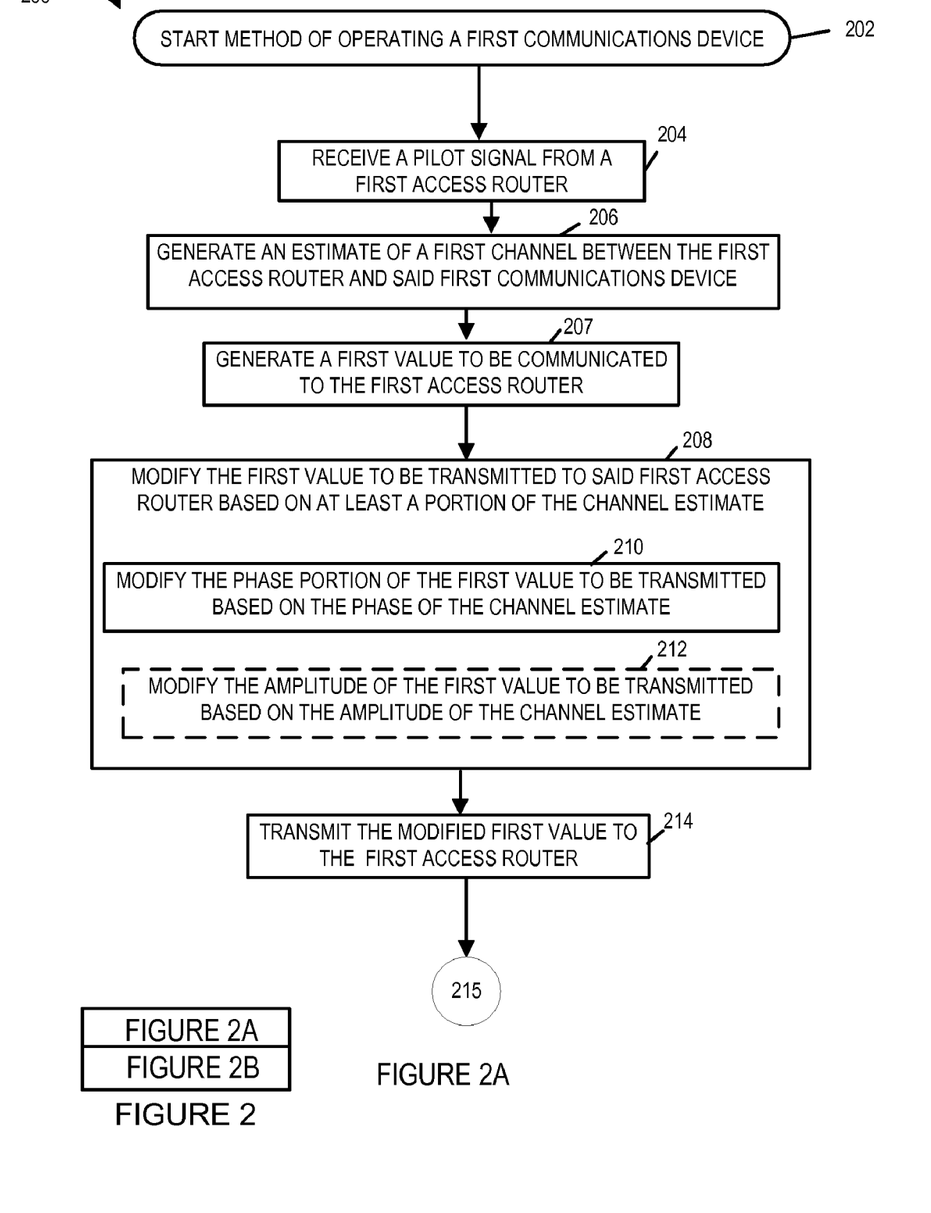
FIG. 2A is a first part of a flowchart of an exemplary method of operating a peer to peer communications device to communicate with another communications device.
Figure 2B:
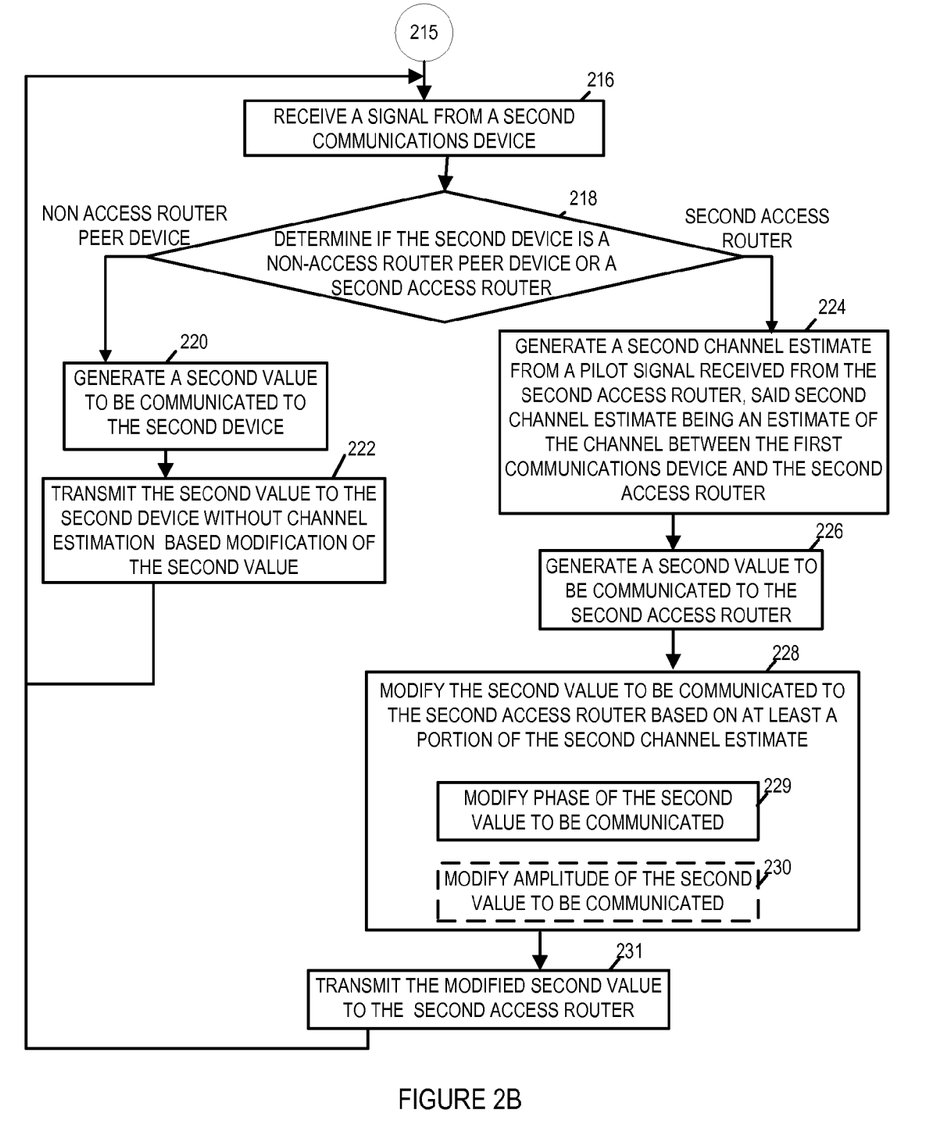
FIG. 2B is a second part of the flow chart of FIG. 2A with FIGS. 2A and 2B in combination comprising FIG. 2.

FIG. 2, which comprises the combination of FIGS. 2A and 2B, is a flowchart 200 of an exemplary method of operating a communications device, e.g., a first peer to peer communications device C 108 of FIG. 1, in accordance with an exemplary embodiment. Operation of the exemplary method starts in step 202 where the device C 108 is powered on and initialized. Operation proceeds from start step 202 to step 204. In other embodiments operation proceeds directly to step 216.

In step 204 the first communications device C 108 receives a pilot signal, e.g., signal 120 from the first access router 106. As discussed earlier, during the operation the access router 106 periodically broadcasts pilot signals to communications devices in the network 100. The operation proceeds from step 204 to step 206 wherein the first communications device C 108 generates a channel quality estimate for the channel between the access router 106 and first device C 108, e.g., based on the received pilot 120 and optionally other pilots received from the first access router 106. Any of a plurality of known channel estimation methods may be used in step 206. Operation proceeds from step 206 to step 207.

In step 207, the communications device C 108 generates a first value, e.g., a complex symbol value X, to be communicated to the first access router 106. The complex symbol value is communicated, in some embodiments, using a single tone signal. The signal may be, e.g., transmission request signal 122. Operation proceeds from step 207 to step 208 wherein the first device C 108 modifies the first value, i.e., the complex symbol value X to be communicated to the access router 106, based on at least a portion of the channel estimate. As discussed earlier, the generated channel estimate is also a complex value having an amplitude and phase. In accordance with one exemplary embodiment, the complex symbol value X to be communicated to the first access router 106 is modified by the first communications device C 108 based on, e.g., the inverse of at least a portion, e.g., phase and/or the amplitude portion, of the channel estimate. In some embodiments, the symbol value modification step 208 includes sub-steps 210 and 212 which may be performed as a part of the symbol value modification. In sub-step 210, the first communications device C 108 modifies the phase portion of the symbol value X to be transmitted to the access router 106, based on the phase of the complex channel estimate. For example, consider that the generated channel estimate H is a complex value such that $H=M e^{j\theta}$, where M represents the amplitude and $\theta$ represents the phase of the generated complex channel estimate. Thus, in accordance with an exemplary embodiment, in sub-step 210 the phase portion of the complex symbol value X is modified by, e.g., the inverse of the phase of the complex channel estimate H, e.g., modified by $-\theta$.

In sub-step 212 which may be performed in some embodiments, device C 108 modifies the amplitude portion of the symbol value X to be transmitted to the first access router 106, based on the amplitude of the complex channel estimate H, e.g., by 1/M. It should be appreciated that it is possible that just one of the sub-steps 210 and 210 may be performed in some embodiments as a part of the symbol value modification step 208. For example, in embodiments where the non-zero level of the signal is not used to communicate information, amplitude modification step 212 may not be used. In some other embodiments, it is possible that both the sub-steps 210 and 212 may be performed. Operation proceeds from step 208 to step 214.

In step 214, device C 108 transmits the modified symbol value, e.g., modified symbol value X' to the first access router 106, where, in some embodiments where both steps 210 and 212 are performed, X'=X/H. Operation proceeds from step 214 to step 216 via the connecting node 215.

In step 216 the first communications device C 108 receives a signal from a second communications device, e.g., communications device B 104. Operation proceeds from step 216 to step 218 wherein device C 108 makes a determination whether or not the second communications device B 104 from which the signal, e.g., signal 124, is received is a non-access router peer device or an access router. If the device C 108 determines in step 218 that the second communications device B 104 is an access router, e.g., a second access router, then the operation proceeds from step 218 to step 224. If it is determined in step 218 that the second device B 104 is not an access router, then the operation proceeds to step 220. For example, the second communications device B 104 may be, e.g., a peer communications device such as an access terminal in which case operation would proceed to step 220. However if the second device B 104 from which the signal was received was second access router F 114, operation would proceed to step 224.

In step 220, the communications device C 108 generates a second symbol value, e.g., a complex symbol value Y, to be transmitted to the second device B 104. Operation proceeds from step 220 to step 222 wherein the first communications device C 108 transmits the generated second symbol value Y to the second device without channel estimation based value modification. Thus, it should be appreciated that the first device C 108 is capable of making decisions as to whether pre-transmission channel compensation is to be performed based on the type of device with which the first device C 108 is communicating. Operation proceeds from step 222 back to step 216.

When the first communications device C 108 determines that the received signal 124 is not from an access router but rather another peer communications device, e.g., an access terminal, operation proceeds from step 218 to step 224.

In step 224, following the determination that the second communications device from which a signal is received is an access router, e.g., second access router F 114, the first communications device C 108 generates a second channel estimate, e.g., channel estimate K, from a pilot signal received from the second device B 104 for the channel between the second device B 104 and the communications device C 108. The generated second channel estimate K may be, e.g., a complex channel estimate having real and imaginary parts. The generated channel estimate K, for example, may be represented in complex form as $K=N\,e^{j\Phi}$, where N represents the amplitude and $\phi$ represents the phase of the generated second complex channel estimate K. The operation proceeds from step 224 to step 226 wherein the first device C 108 generates a second symbol value, e.g., symbol value Y, to be communicated to the second access router F 114. In some embodiments, the second value Y communicates a quality of service (QoS) level information using the phase component of the transmitted value with the amplitude being used to signal a transmission request, the QoS level corresponding to the data to which the transmission request corresponds. Operation proceeds from step 226 to step 228. In step 228, the first communications device C 108 modifies the generated second symbol value, e.g., the complex symbol value Y to be communicated to the second device B 104, based on at least a portion of the generated second channel estimate. In sub-step 229 the phase of the second symbol value is modified. In sub-step 230 the amplitude of the second value is modified. For example, the second symbol value may be modified by the first communications device C 108 based on at least one of, e.g., phase and/or the amplitude, of the second complex channel estimate K. In some embodiments, the phase portion of the second complex symbol value Y is modified by the inverse of the phase of the complex channel estimate K, while in some other embodiments, the amplitude portion of the symbol value Y is modified by the inverse of the amplitude, i.e., N, of the complex channel estimate K. While in still other embodiments both phase and amplitude is modified based on the second channel estimate.

Operation proceeds from step 228 to step 230 wherein the first communications device C 108 transmits the resulting modified symbol value Y' to the second device B 104. The operation proceeds from step 230 back to step 216.

Figure 3:
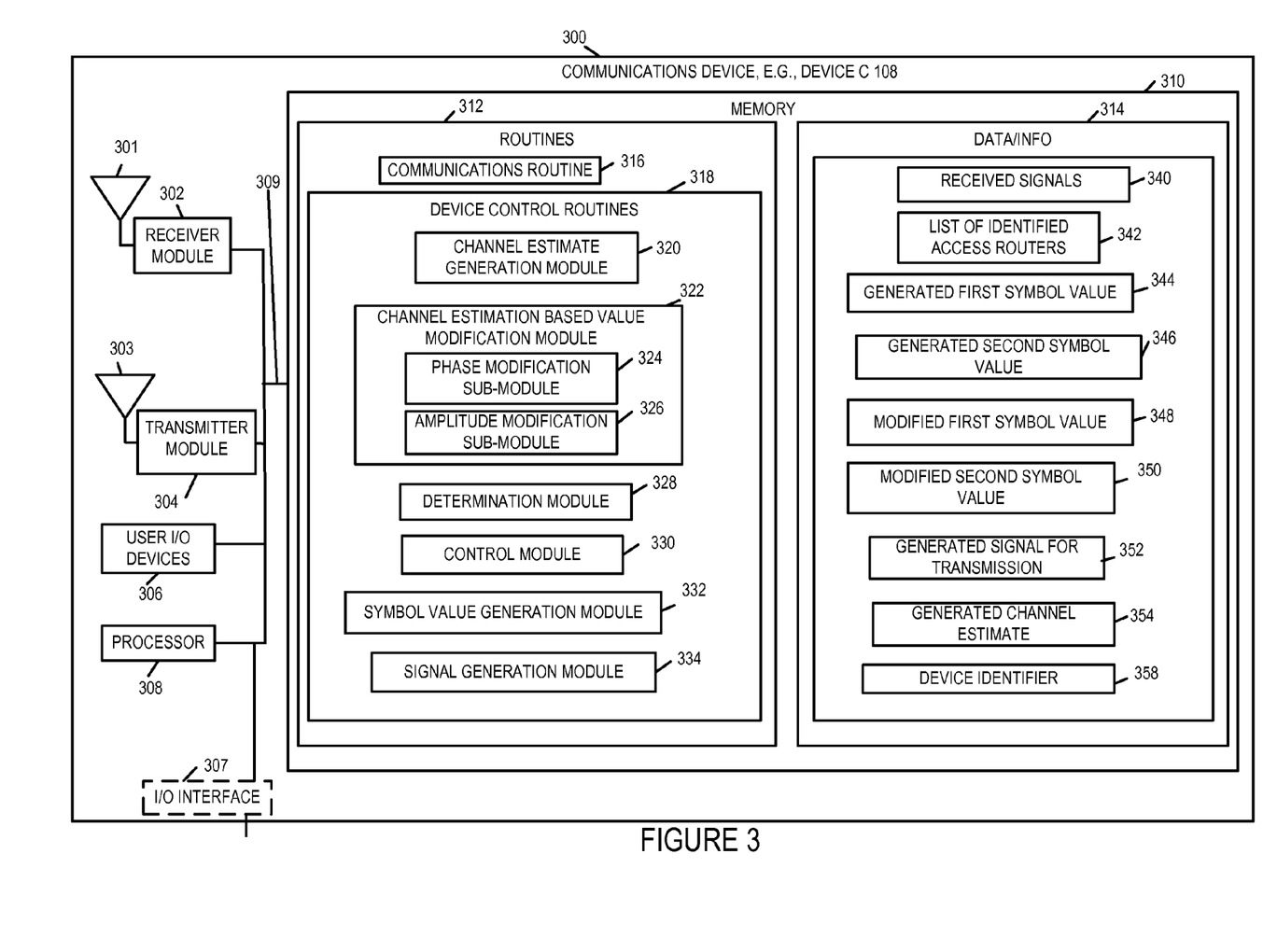
FIG. 3 illustrates an exemplary peer to peer communications device which can be used in the exemplary system shown in FIG. 1.

FIG. 3 is a drawing of an exemplary communications device 300, e.g., a peer to peer communications device, which may be used as first device C 108 of FIG. 1, in accordance with an exemplary embodiment.

Exemplary communications device 300 includes wireless receiver module 302, wireless transmitter module 304, user I/O devices 306, a processor 308, and memory 310 coupled together via a bus 309 over which the various elements may interchange data and information. Receiver module 302 is coupled to a receive antenna 301 while the transmitter module 304 is coupled to a transmit antenna 303. In some embodiments, the communications device 300 also includes an I/O interface 307 coupled to bus 309. The I/O interface 307 maybe a wired interface, via which communications device 300 may be coupled to a backhaul network including other network nodes, a cellular network, and/or the Internet.

Memory 310 includes routines 312 and data/information 314. The routines 312 may be implemented as modules. The processor 308, e.g., a CPU, executes the routines 312. Using the data/information 314 in memory 310, the processor 308 under the control of one or more routines, controls the communications device 300 to implement methods, e.g., a method in accordance with flowchart 200 of FIG. 2.

Routines 312 include a communications routine 316 and a set of device control routines 318. The communications routine 316 implements the various communications protocols used by the communications device 300. The device control routines 318 include a channel estimate generation module 320, a channel estimate based value modification module 322, a determination module 328, a control module 330, a symbol value generation module 332, and a signal generation module 334. The channel estimate based value modification module 322 includes a phase modification sub-module 324 and an amplitude modification sub-module 326.

Data/information 314 includes received signals 340 (e.g., pilot signals, transmission request signals, transmission request response signals etc.), a maintained list 342 of identified access routers in the network 100, generated first symbol value 344, generated second symbol value 346, modified first symbol value 348, modified second symbol value 350, generated signal for transmission 352, generated channel estimate 354, and a device identifier 358.

Wireless receiver module 302 which maybe, e.g., an OFDM receiver, is coupled to the receive antenna 301 via which the communications device 300 receives signals from other communications devices in the region. Received signals include e.g., transmission request signals, transmission request response signals, peer discovery signals, pilot signals etc, which are received by the communications device 300. The wireless receiver module 602 is configured to receive pilot signals, e.g., pilot signals 120, from access routers in the network, e.g., first access router E 106 and second access router F 114. The receiver 302 is further configured to, at different points in time during the operation, receive signals from other communications devices, e.g., a second device such as communications device B 104.

Wireless transmitter module 304 maybe, e.g., an OFDM transmitter. The transmitter 304 is coupled to transmit antenna 303 via which the communications device 300 transmits signals to other communications devices in the region. In some embodiments, the same antenna is used for the receiver and the transmitter rather than separate antennas 301, 303 being used. During the operation, the wireless transmitter module 304 may, and sometimes is, configured to transmit, e.g., a channel estimation based modified first symbol value, to an access router 16, 114 communications network 100 In some embodiments, at some different point in time during the operation, the transmitter module 304 is further configured to transmit a second value, e.g., second symbol value Y, to a non access router peer communications device, e.g., communications device B 104, without a channel estimation based value modification. In some embodiments, the transmitter module 304 is further configured to transmit a channel estimation based modified second value, e.g., modified value Y', to the second communications device when the second communications device is the second access router F 114. The transmitter module 304 may also transmit other signals, e.g., traffic data signal, at various points in time. The traffic data may include user data, e.g., peer to peer traffic data conveying text, audio, and/or image data and may or may not be subject to pre-transmission channel compensation depending on the embodiment.

Channel estimate generation module 320 is configured to generate a channel estimate for the channel between the first access router E 106 and the communications device 300. In some embodiments, the communications device 300 may use the pilot signal 120 received from the first access router E 106 to generate the channel estimate of the channel between the first access router E 106 and the first communications device 300. The channel estimate generation module 320 is further configured to generate a channel estimate of the channel between said communications device 300 and a second communications, e.g., second access router F 114. In some embodiments, the channel estimate generation module 320 is configured to generate a complex channel estimates. Each generated complex channel estimate may have a real and an imaginary part. Thus, it should be appreciated that in accordance with an exemplary embodiment, the channel estimate generation module 320 is responsible for generating complex channel estimates.

Channel estimation based value modification module 322 is configured to modify one or more symbol values to be communicated, e.g., first symbol value X, to be transmitted to the first access router 106 based on at least a portion of the channel estimate between the first access router E 106 and communications device 300. In some embodiments, the channel estimation based modification module 322 includes a phase modification sub-module 324 configured to modify a phase portion of the symbol value to be communicated by the inverse of the phase portion of the complex channel estimate. In some embodiments the channel estimation based modification module further includes an amplitude modification sub-module 326 configured to modify the amplitude of the first symbol value based on an amplitude portion of the channel estimate as previously discussed.

In some embodiments where the communications device 300 receives a signal from a second device, e.g., device B 104, and it is determined that the second device is the second access router F 114, the channel estimation based modification module 322 is further configured to modify a second symbol value to be transmitted to the second access router F 114, based on at least a portion of the channel estimate of the channel between the communications device 300 and the second access router F 114. In some such embodiments, when the second value is to be communicated using phase modulation, with using the non-zero level of the signal to communicate information, the channel estimation based modification module is configured to use the phase modification sub-module 324 to modify only the phase of the second value. While in some other embodiments when the second value is to be communicated to the second device using a combination of phase and amplitude modulation, the channel estimation based modification module 322 is configured to use both the phase and amplitude modification sub-modules 324, 326 to modify the phase and amplitude of the second value to be transmitted.

Determination module 328 is configured to determine if a second device B 104 from which a signal was received, is a non-access router peer device or an access router e.g., which support peer to peer signaling. The determination may be made, e.g., using some device and/or connection identifier or other information associated with the second device B 104 which may have been received, e.g., as part of a device discovery communication. Based on the determination by the determination module 328, the communications device 300 decides whether or not to modify the generated second value before transmitting to the second device.

Control module 330 is responsible for controlling the operation of one or more of the modules in device 300. Among other things, the control module 330 controls the channel estimation based modification of the second value based on the determination of the type of second device B 104. If the determination module 328 determines that the second device B 104 is an access router, then the control module 330 allows the generated second value to be modified by the channel estimation based value modification module 322 prior to transmission of second value to the second device. However, if the determination module 328 determines that the second device is a non-access router peer device, then the control module 330 allows the second value to be transmitted without any pre-transmission channel estimation based modification.

Symbol value generation module 332 is configured to generate symbol values, e.g., first and second symbol values, to be communicated from the device 300 to other communications devices. In some embodiments the generated symbol value is a complex symbol value having an amplitude and phase component. Signal generation module 334 is configured to generate signals, e.g., transmission request signals and/or other signals, from symbol values produced by module 332. The signals are for transmission from communications device 300 to other communications devices in the network 100 with which device 300 seeks to communicate. In some embodiments the signal generation module 334 is configured to generate single tone signals, e.g., a single tone transmission request and/or request response signal. In various embodiments, a signal generated by the signal generation module 334 carries the symbol value generated by the symbol value generation module 332 when pre-transmission channel based symbol modification is not used and carries the modified symbol value produced by module 322 when pre-transmission symbol modification is used.

Received signals 340 include signals which are received by the wireless receiver module 302 and processed by various other modules of communications device 300. Received signals 340 may include, e.g., pilot signals, e.g., signal 120, transmission request/request response signals, received traffic data signals, signal 124 received from second device B 104 etc. List of identified access router 342 is a list of access routers that is maintained and updated by the communications device 300 and identifies access routers e.g., in the network 100, including the first access router 106. The list 342 may include information associating device identifiers with device type information.

Generated first symbol value 344 is, e.g., a first complex symbol value generated by the symbol value generation module 332 which is to be communicated to the first access router E 106. The generated first symbol value may be an output of the symbol value generation module 332 and an input to the channel estimation based value modification module 322. Generated second symbol value 346 is, e.g., a second complex value to be communicated from device 300. Depending on the determination whether or not the second device is an access router, the second symbol value may or may not be subjected to channel estimation based modification prior to transmission.

Modified first symbol value 348 is, e.g., a channel estimation based modified first value, and is an output of the channel estimation based value modification module 322. Modified second symbol value 350 is, e.g., a channel estimation based modified second value, and is also an output of the channel estimation based value modification module 322. In some embodiments, the modified first and second values 344, 346, may be produced by, e.g., phase modification, and/or amplitude modification and/or both phase and amplitude modification, of the generated first and second symbol values 344, 346 respectively, in accordance with the method discussed in flowchart 200 discussed earlier.

Generated signal for transmission 352 is an output of the signal generation module 334, and may be any of the signals to be transmitted from device 300 to another communications device. For example, the generated signal for transmission 352 may be, e.g., a transmission request signal 122 transmitted to the access router 106.

Generated channel estimate 354 is a channel estimate generated by the channel estimate generation module 320.

Device identifier 358 is an identifier associated with the communications device 300. In some embodiments, the device identifier 358 may be, e.g., a physical layer identifier of the device 300.

Figure 4:
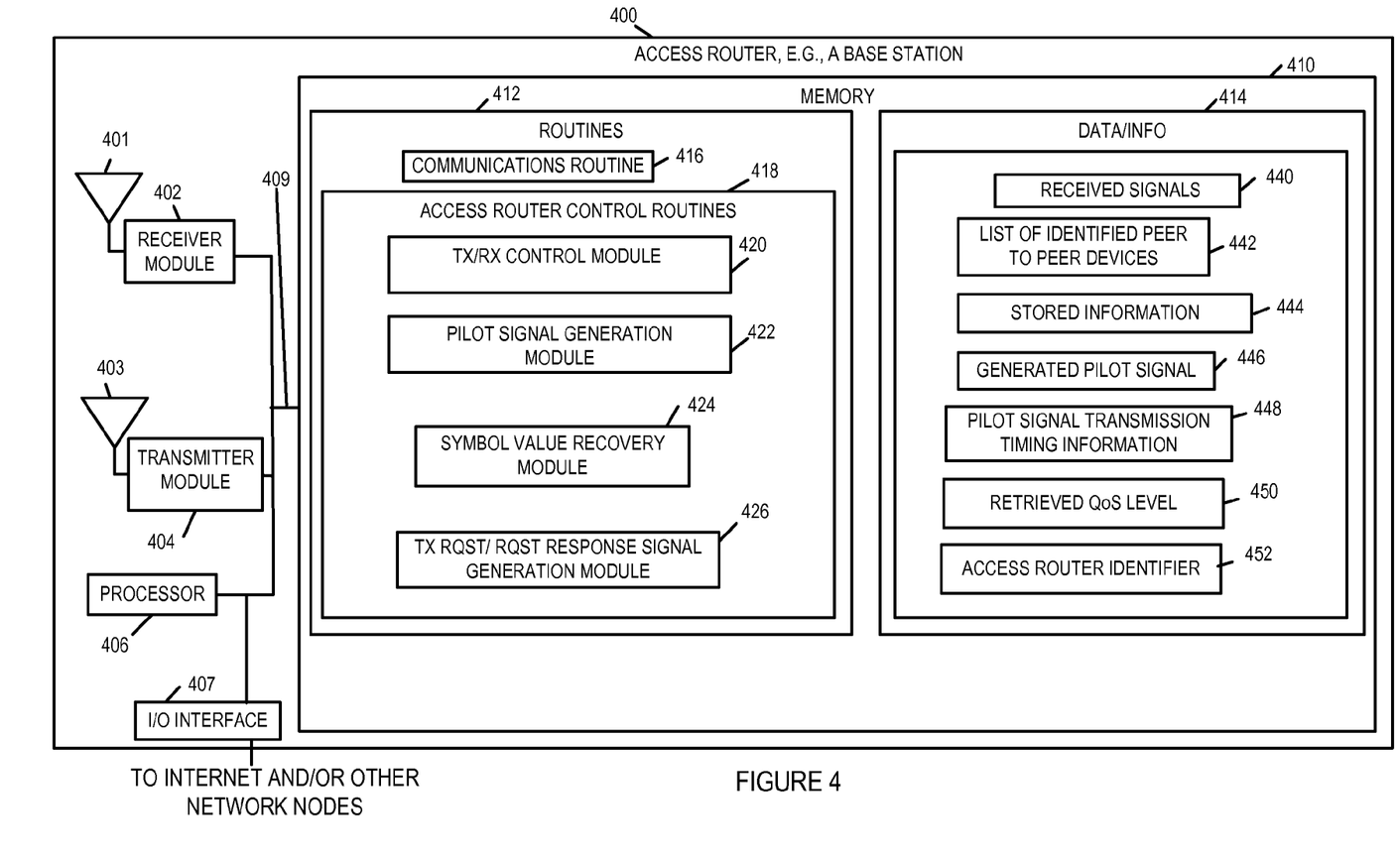
FIG. 4 illustrates an exemplary access router which can be used in the system of FIG. 1.

FIG. 4 is a drawing of an exemplary access router 400, e.g., a base station, which may be implemented as, e.g., the first access router 106 of FIG. 1, in accordance with an exemplary embodiment.

Exemplary access router 400 includes wireless receiver module 402, wireless transmitter module 404, a processor 406, an I/O interface 407 and memory 410 coupled together via a bus 409 over which the various elements may interchange data and information coupled to bus 409. The I/O interface 407 maybe a wired interface, via which the access router 400 may be coupled to a backhaul network including other network nodes, a cellular network, and/or the Internet.

Memory 410 includes routines 412 and data/information 414. The processor 406, e.g., a CPU, executes the routines 412. Using the data/information 414 in memory 410, the processor 406 under the control of one or more routines, controls the access router 400 to perform various functions.

Routines 412 include a communications routine 416 and a set of access router control routines 418. The communications routine 416 implements the various communications protocols used by the access router 400. The access router control routines 418 include a transmit/receive control module 420, a pilot signal generation module 422, a timing module 424 and a transmission request/transmission request response signal generation module 426.

Data/information 414 includes received signals (e.g., a transmission request signals, transmission request response signals etc.), a maintained list 442 of identified peer to peer communications devices, e.g., in the network 100, stored information 444, generated pilot signal 446, access router channel information 448, pilot signal transmission timing information 450, and access router identifier 452.

Wireless receiver module 402 which maybe, e.g., an OFDM receiver, is coupled to receive antenna 401 via which the access router 400 receives signals from other communications devices in the region. Received signals include e.g., transmission request/request response signals such as signal 122, traffic data signals etc. During the operation, the wireless receiver module 402 may receive a signal e.g., signal 122 communicating a symbol value, e.g., first value, from another communications device, e.g., first communications device C 108. In some embodiments, the received signal 122 is a single tone signal and the symbol value is a complex symbol value. Signal 122 from the first device C 108 may be, e.g., a request to transmit data from the device C 108 to the access router 400. The phase of the signal 122 may communicate QoS information associated with the data the first communications device C 108 is seeking to communicate.

Wireless transmitter module 404 maybe, e.g., an OFDM transmitter. The transmitter 404 is coupled to transmit antenna 403 via which the access router 400 transmits signals to other communications devices in the region. In some embodiments, the same antenna is used for the receiver and the transmitter rather than separate antennas 401, 403. During the operation, the wireless transmitter module 404 may, and sometimes does, transmit, e.g., pilot signals 120, transmission request signals, transmission request response signals, traffic data, to other devices in a communications network, e.g., network 100. The data may include user data, e.g., peer to peer traffic data conveying text, audio, and/or image data.

Transmit/Receive (Tx/Rx) control module 420 controls the access router to periodically transmit, e.g., pilot signals, such as signal 120, to one or more of the communications devices, e.g., device A 102, device B 104, device C 108 etc. The Tx/Rx control module 420 also controls the access router transmitter 404 to transmit traffic data at different times during the operation, e.g., upon receipt of a transmission request response signal from a device with which the access router 400 is communicating. The Tx/Rx control module 420 also controls the access router receiver 402 to receive various signals, e.g., request signals, request response signals, traffic data signals, at different points in time during the operation.

Pilot signal generation module 422 is configured to generate pilot signals, e.g., pilot signal 120, to be transmitted from the access router 400 to one or more of the other communications devices in the network. The generated pilot signal 446 when transmitted to another device, may and sometimes is, used by the other device to generate an estimate of the channel between the access router 400 and the other device.

Symbol value recovery module 424 is responsible for recovering the complex symbol value, e.g., first symbol value, communicated on the single tone signal, e.g., signal 122 received from the communications device C 108 or from signals received from other devices. In some embodiments, the symbol recovery module 424 retrieves and separately stores the additional information, e.g., QoS level, coded on the phase portion of the received complex symbol value. The retrieved QoS level information may, and sometimes is, broadcast by the access router 400 to other communications devices so that the communications devices in the vicinity are aware of, e.g., the QoS level of the traffic data from communications device C 108 to the access router 400. In cases where a received symbol value was subject to pre-transmission channel compensation, the symbol recovery module 424 performs the symbol recovery operation without the aid of a channel estimate and without performing a channel compensation operation on the received signal.

Transmission request/request response signal generation module 426 is configured to generate signals, e.g., transmission request signals and/or transmission request response signals, to be transmitted from the access router 400 to other communications devices in the network 100 with which access router 400 seeks to communicate.

Received signals 440 represent signals which are received by the wireless receiver module 402. Received signals 440 may include, e.g., transmission request signals, request response signals, received traffic data signals etc. List of identified peer to peer communications devices 442 is a list of peer to peer communications devices in the network 100 that is maintained and updated by the access router 400. The list of peer to peer devices 442 identifies peer to peer communications devices from which the access router 400 has received some identification signal, e.g., a peer discovery signal, at some point in time during the operation.

Stored information 444 includes information regarding the network 100 where the access router 400 is operating. The information includes, e.g., information regarding the resources available to the access router 400 for communicating with other devices in the network 100. Generated pilot signal 446 is an output of the pilot signal generation module 422 and may be transmitted from the access router 400 to one or more communications devices in the network 100.

Pilot signal transmission timing information 448 includes the timing information used by the Tx/Rx control module 420 for controlling the transmitter 404 to periodically transmit pilot signals to one or more communication devices. Retrieved QoS level information 450 is the QoS level retrieved by the symbol value recovery module 424 from the phase portion of the recovered symbol value, e.g., first symbol value X. The retrieved QoS level information 450 is stored in the memory 410 and is sometimes broadcasted from the access router 400 to one or more communications devices in the vicinity as discussed earlier.

Access router identifier 452 is an identifier corresponding to the access router 400. In some embodiments, the access router identifier 452 is unique to each access router operating in the communications network 100 and may not change during the operation of the access router 400.

Figure 5:
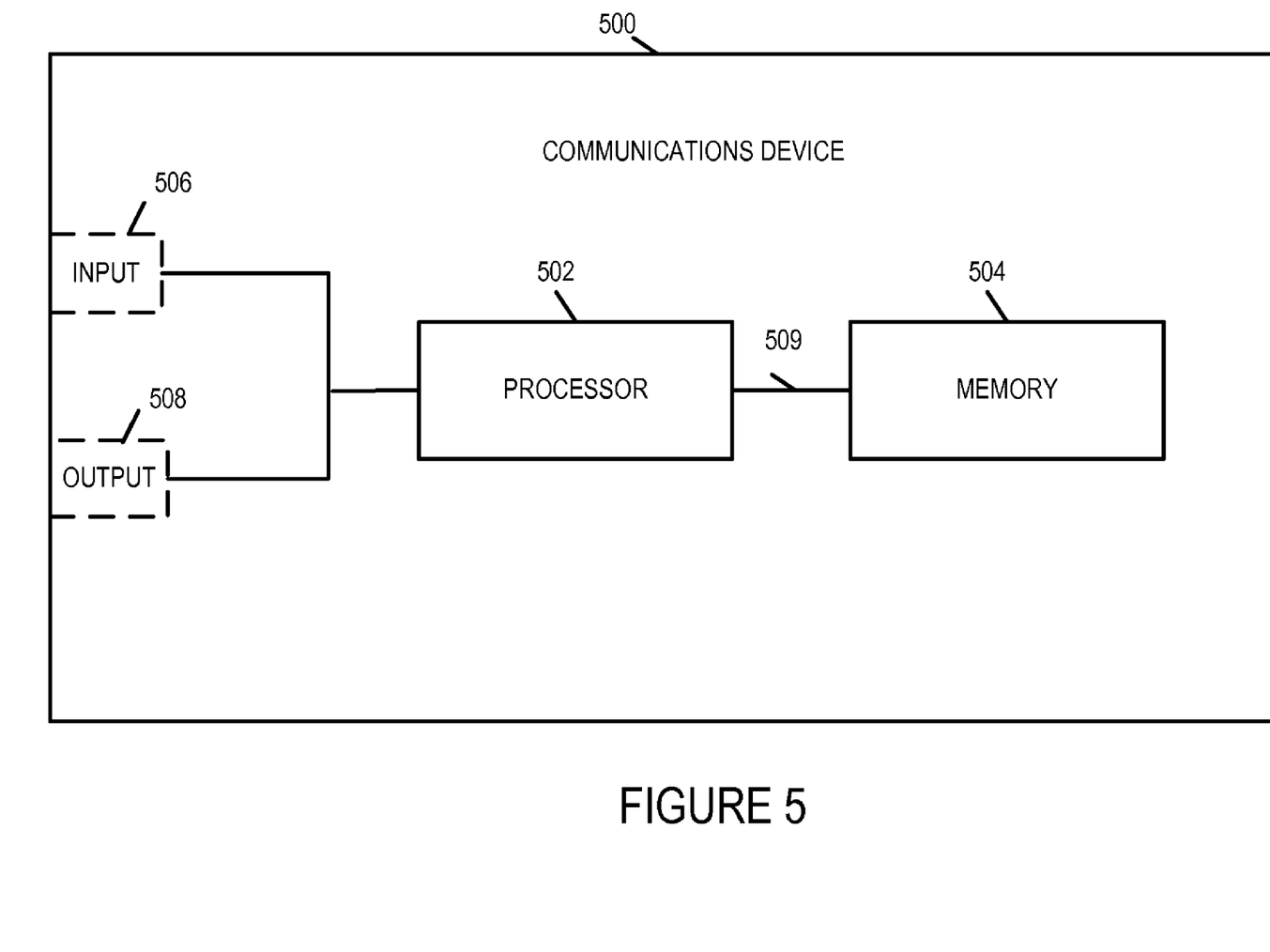
FIG. 5 shows another exemplary communications device which can be used in the system of FIG. 1.

FIG. 5 is a drawing of an exemplary communications device 500 in accordance with one exemplary embodiment. Communications device 500 maybe, and in at least one embodiments is, a mobile wireless terminal supporting peer to peer communications and implementing a method in accordance with flowchart 200 of FIG. 2. The communications device 500 may be used as communication device C 108 of FIG. 1. Communications device 500 includes a processor 502 and memory 504 coupled together via a bus 509 over which the various elements (502, 504) may interchange data and information. Communications device 500 further includes an input module 506 and an output module 508 which may be coupled to the processor 502 as shown. However, in some embodiments the input module and output module 506, 508 are located internal to the processor 502. Input module 506 can receive input signals. Input module 506 can, and in some embodiments does, include a wireless receiver and/or a wired or optical input interface for receiving input. Output module 508 may include, and in some embodiments does include, a wireless transmitter and/or a wired or optical output interface for transmitting output. Processor 502 is configured to: receive a pilot from a first access router, generate a first channel estimate of a channel between the first access router and said communications device, and modify a first value to be transmitted to said first access router based on at least a portion of said channel estimate.

In some embodiments, the first channel estimate is, said first value is a complex symbol value, and wherein the processor is further configured to modify the phase portion of the first value based on the phase portion of the complex channel estimate. In some embodiments the processor 502 is further configured to modify the amplitude of the first value based on an amplitude portion of the complex channel estimate. In some embodiments, the processor 502 is further configured to: receive a signal from a second device, determine if the second device is a non-access router peer device or an access router, and transmit a second value to be communicated to the second device without channel estimation based value modification when said second device is determined to be a non-access router peer device. In some other embodiments, the processor 502 is further configured to: generate a second channel estimate, said second channel estimate being an estimate of the channel between said communications device and the second communications device when said second device is determined to be a second access router, modify the second value to be transmitted to the second access router based on at least a portion of the second channel estimate, and transmit the modified second value.

In some such embodiments, when said second value to be communicated to the second access router is to be communicated using phase only modulation, the processor 502 is configured to modify the second value by modifying only the phase of the value to be transmitted. In some other embodiments, when said second value to be communicated to the second access router is to be communicated using a combination of phase and amplitude modulation, the processor 502 is further configured to modify both the phase and amplitude of the second value to be transmitted.

Figure 6:
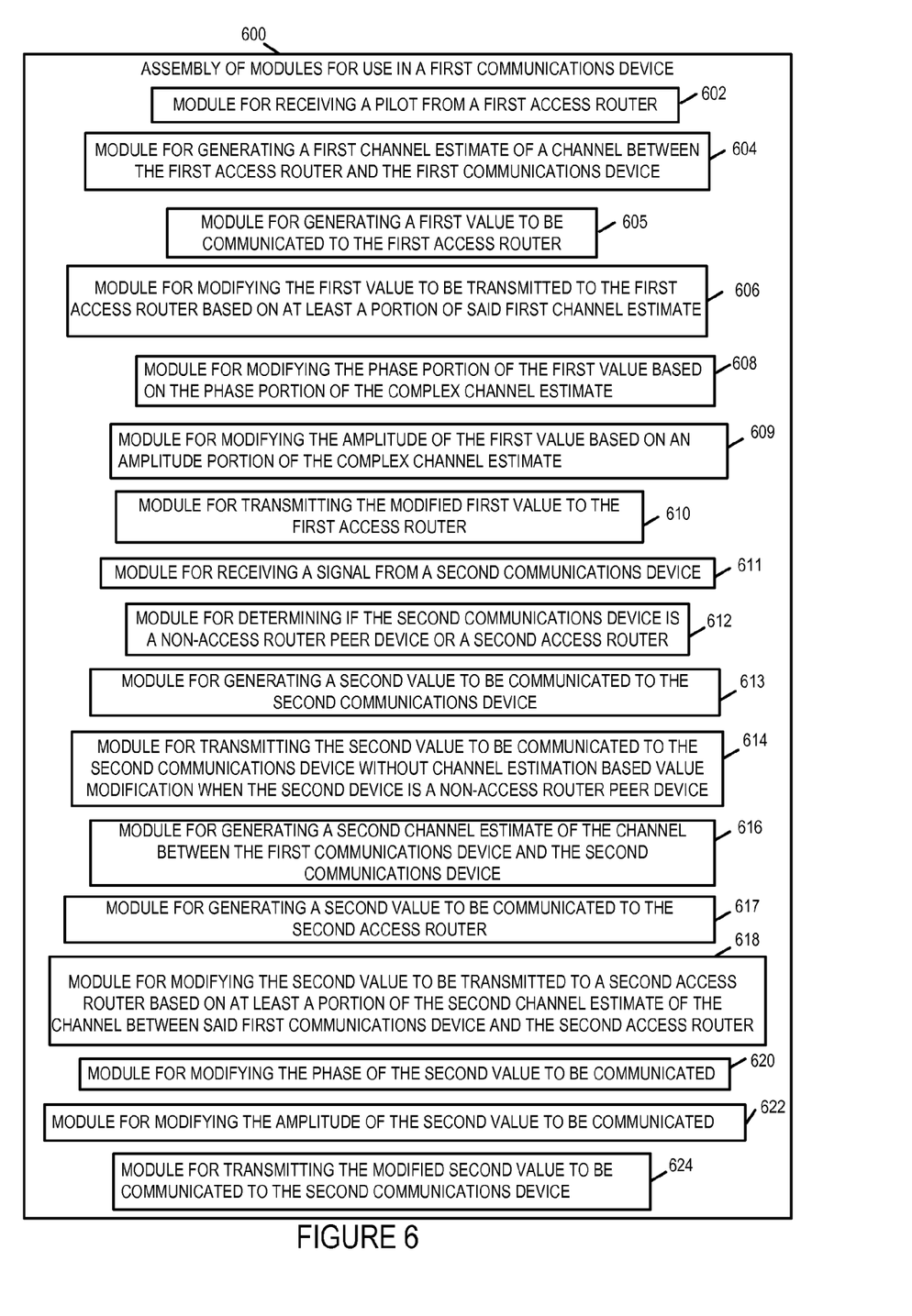
FIG. 6 illustrates an assembly of modules which can be used in the exemplary communications device of FIG. 5.

FIG. 6 is an assembly of modules 600 which can, and in some embodiments are, used in the communications device illustrated in FIG. 5. The modules in the assembly 600 can be implemented in hardware within the processor 502 of FIG. 5, e.g., as individual circuits. Alternatively, the modules may be implemented in software and stored in the memory 504 of the communications device 500 shown in FIG. 5. While shown in the FIG. 5 embodiment as a single processor, e.g., computer, it should be appreciated that the processor 502 may be implemented as one or more processors, e.g., computers.

When implemented in software the modules include code, which when executed by the processor 502, configure the processor to implement the function corresponding to the module. In embodiments where the assembly of modules 600 is stored in the memory 504, the memory 504 is a computer program product comprising a computer readable medium comprising code, e.g., individual code for each module, for causing at least one computer, e.g., processor 502, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 6 control and/or configure the communications device 500 or elements therein such as the processor 502, to perform the functions of the corresponding steps illustrated in the method flow chart of FIG. 2.

As illustrated in FIG. 6, the assembly of modules 600 includes a module 602 for receiving a pilot from a first access router, a module 604 for generating a first channel estimate of a channel between the first access router and the first communications device, a module 605 for generating a first value to be communicated to the first access router, a module 606 for modifying the first value to be transmitted to the first access router based on at least a portion of said first channel estimate. The assembly of modules 600 further includes a module 608 for modifying the phase portion of the value to be transmitted based on the phase of the complex channel estimate, a module 609 for modifying the amplitude of the first value based on an amplitude portion of the complex channel estimate, a module 610 for transmitting the modified first value to the first access router, a module 611 for receiving a signal from a second communications device, a module 612 for determining if the second communications device is a non-access router peer device or a second access router, a module 613 for generating a second value to be communicated to the second communications device, and a module 614 for transmitting a second value to be communicated to the second communications device without channel estimation based modification of the second value when the second device is a non-access router peer device.

The assembly of modules 600 further includes a module 616 for generating a second channel estimate of the channel between the first communications device, e.g., device 500, and the second communications device, when the second communications device is determined to be a second access router, a module 617 for generating a second value to be communicated to the second access router, a module 618 for modifying the second value to be transmitted to the second access router based on at least a portion of the second channel estimate of the channel between said first communications device and the second access router, a module 620 for modifying the phase of the second value to be communicated, a module 622 for modifying the amplitude of the second value to be communicated, and a module 624 for transmitting the modified second value to be communicated to the second communications device.

For the above discussion it should be appreciated that numerous variations and embodiments are possible.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first communications device, comprising:
   receiving a pilot from a first access router;
   generating a first channel estimate of a channel between the first access router and said first communications device;
   modifying a first value to be transmitted to said first access router based on at least a portion of said first channel estimate;
   determining if a second communications device is a non-access router peer device; and
   when said second communications device is determined to be a non-access router peer device, transmitting a second value to be communicated to the second communications device without channel estimation based modification of the second value.

2. The method of claim 1,
   wherein said first channel estimate is a complex channel estimate;
   wherein said first value is a complex symbol value; and
   wherein modifying the first value includes modifying the phase portion of the value to be transmitted based on the phase of the complex channel estimate.

3. The method of claim 2, wherein modifying the first value further includes:
modifying the amplitude of the first value based on an amplitude portion of the complex channel estimate.

4. The method of claim 1, further comprising:
when said second communications device is a second access router,
generating a second channel estimate of the channel between said first communications device and the second communications device;
modifying the second value to be transmitted to the second access router based on at least a portion of the second channel estimate of the channel between said first communications device and the second access router; and
transmitting the modified second value to be communicated to the second communications device.

5. The method of claim 4, wherein when said second value to be communicated to the second access router is to be communicated using phase only modulation, said modifying the second value includes modifying only the phase of the second value to be communicated.

6. The method of claim 4, wherein when said second value to be communicated to the second access router is to be communicated using a combination of phase and amplitude modulation, said modifying the second value includes modifying both the phase and amplitude of the value to be transmitted.

7. The method of claim 1, wherein the second value is a Quality of Service (QoS) value to be communicated.

8. A first communications device comprising:
at least one processor configured to:
receive a pilot from a first access router;
generate a first channel estimate of a communications channel between the access router and said communications device;
modify a first value to be transmitted to said access router based on at least a portion of said channel estimate;
receive a signal from a second communications device;
determine if the second communications device is a non-access router peer device; and
transmit a second value to be communicated to the second communications device without channel estimation based value modification, when said second communications device is determined to be a non-access router peer device; and
a memory coupled to said at least one processor.

9. The first communications device of claim 8,
wherein said first channel estimate is a complex channel estimate;
wherein said first value is a complex symbol value; and
wherein said processor is configured to modify the phase portion of the first value based on the phase portion of the complex channel estimate when modifying said first value.

10. The first communications device of claim 9, wherein said at least one processor is configured to:
modify the amplitude of the first value based on an amplitude portion of the complex channel estimate when modifying said first value.

11. The first communications device of claim 8, wherein said at least one processor is further configured to:
generate a second channel estimate of a communications channel between said communications device and the second communications device when said second device is determined to be a second access router;
modify the second value to be transmitted to the second access router based on at least a portion of the second channel estimate of the communications channel between said first communications device and the second access router; and
transmit the modified second value to the second access router.

12. The first communications device of claim 11, wherein when said second value to be communicated to the second access router is to be communicated using phase only modulation, said at least one processor being configured to modify the second value by modifying only the phase of the value to be transmitted when said second value is modified.

13. The first communications device of claim 11, wherein when said second value to be communicated to the second access router is to be communicated using a combination of phase and amplitude modulation, said at least one processor being configured to modify both the phase and amplitude of the second value to be transmitted.

14. The communications device of claim 8, wherein the second value is a QoS value to be communicated.

15. A first communications device, comprising:
means for receiving a pilot from a first access router;
means for generating a first channel estimate of a channel between the access router and said first communications device;
means for modifying a first value to be transmitted to said first access router based on at least a portion of said first channel estimate;
means for determining if a second communications device is a non-access router peer device; and
means for transmitting a second value to be communicated to the second communications device without channel estimation based modification of the second value when said second communications device is determined to be a non-access router peer device.

16. The first communications device of claim 15,
wherein said first channel estimate is a complex channel estimate;
wherein said first value is a complex symbol value; and
wherein modifying the first value includes modifying the phase portion of the value to be transmitted based on the phase of the complex channel estimate.

17. The first communications device of claim 16, wherein said means for modifying a first value comprises:
means for modifying the amplitude of the first value based on an amplitude portion of the complex channel estimate.

18. The first communications device of claim 15, further comprising:
means for generating a second channel estimate of the channel between said first communications device and the second communications device when said second communications device is a second access router;
means for modifying the second value to be transmitted to the second access router based on at least a portion of the second channel estimate of the channel between said first communications device and the second access router; and
means for transmitting the modified second value to be communicated to the second communications device.

19. A computer program product for use in a communications device, comprising:
a non-transitory computer readable medium comprising:
code for causing at least one computer to receive a pilot from a first access router;

code for causing the at least one computer to generate a first channel estimate of a channel between the access router and said first communications device;

code for causing the at least one computer to modify a first value to be transmitted to said first access router based on at least a portion of said first channel estimate;

code for determining if a second communications device is a non-access router peer device; and code for transmitting a second value to be communicated to the second communications device without channel estimation based modification of the second value when said second communications device is determined to be a non-access router peer device.

* * * * *